Patented July 14, 1942

2,289,784

UNITED STATES PATENT OFFICE 2,289,784

PRODUCTION OF CATALYSTS

Augustus S. Houghton, Rivervale, N. J., assignor, by mesne assignments, to Allied Chemical & Dye Corporation, a corporation of New York No Drawing. Application July 20, 1939, Serial No. 285,525

19 Claims. (Cl. 252—256)

This invention relates to catalysts for use in various catalytic processes such as hydrogenation, dehydrogenation and oxidation and more particularly to the production of such catalysts.

In catalyzing chemical reactions such as hydrogenation, dehydrogenation and oxidation of organic materials, particularly in carrying out vapor phase reactions, it is advantageous to employ as the catalyst masses of metal such as nickel, copper and cobalt having a surface layer or film of catalytically active compound or form of the metal. The high heat conductivity of the metal bases of such catalysts aids in distribution and transfer of the heat of reaction and facilitates temperature control of exothermic catalytic processes as compared with lower heat conductivity of bases such as particles of alundum or carborundum impregnated with catalytic material. In carrying out some reactions there appears to be less tendency to produce undesirable reaction products when metal base catalysts are employed than when alundum- or carborundum-base catalysts are utilized; for example, hydrogenation of phenol to cyclohexanol utilizing masses of nickel coated with an adherent catalytically active layer is accompanied in some cases by formation of less cyclohexane than when the reaction is carried out in the presence of alundum or carborundum impregnated with nickel catalyst. Furthermore, metal base catalysts may be arranged in bulk or space form, e. g. as assemblies of wire gauze or cages of metal particles and are superior to catalysts of the powder type for many purposes, especially continuous operations, in that they can more readily be distributed substantially uniformly throughout the path of flow of materials undergoing reaction, and reacted materials can be readily separated continuously from such catalyst. Moreover, bulk type catalysts possess the advantages that they may be prepared, activated and introduced into and removed from the reaction chambers as masses of substantial size as distinguished from small particles thereby greatly facilitating the handling of the catalysts.

Heretofore, it has been proposed to prepare nickel catalysts chemically by treating masses of metallic nickel with hypochlorous acid or hypochlorite to oxidize a portion of the nickel, washing the material and then reducing the nickel oxide in hydrogen. This procedure is subject to the disadvantage that satisfactory adherence of the nickel oxide to the underlying catalytic nickel is not obtained, with the result that the oxide is extensively removed in the hypochlorite bath and in subsequent treatment, e. g. washing the material.

It is an object of the invention to provide a process of producing catalytic material of improved capacity, ruggedness and life. By capacity is meant the capability of the catalyst to catalyze a given amount of reactants passed thereover per unit of time; as between two catalysts the one which permits the passage of the larger volume or amount of reactants per unit of time to give the same percentage of conversion or reaction is understood to have the greater capacity.

It is another object of the invention to provide a novel procedure for producing easily reactivatable rugged catalysts involving a mass of metal having an active catalytic surface adherent to and supported by the metal mass. By "adherent surface" is meant a surface which is not readily detached from the underlying metal by washing with water and not necessarily a surface which will withstand more vigorous action such as rubbing.

It is a further object of the invention to provide a novel improved process for reactivating catalysts whose activity has been impaired. Other objects and advantages will appear hereinafter.

In accordance with the invention, I immerse masses of metallic nickel, copper or cobalt such as metal turnings, rings, gauze, wool, millings and the like, in a solution of oxalic, maleic or tartaric acid, or a salt thereof, so as to produce an adherent layer of the metal oxalate, maleate or tartrate on the surfaces of the metal masses. Other materials may be incorporated in the solution containing the metal undergoing treatment, e. g. an oxidizing agent such as nitric acid may be added to increase the reaction of the solution with the metal. After an adherent layer or film of the metal salt of the organic acid employed is formed on the surface of the metal masses they are removed from the solution, drained, dried and the salt is decomposed, for example, in an atmosphere of oxidizing gas such as nitrous oxide, oxygen, or air maintained at an elevated temperature, preferably at from 300° to 380° C. when oxalic acid is employed. The resultant metal masses having an adherent catalytically active surface layer of oxide of the metal may be employed as catalysts in the hydrogenation, dehydrogenation and oxidation of many organic materials.

In preparing active catalysts from spent catalytic material involving masses of metallic nickel, copper or cobalt having catalytic surfaces of reduced activity, the spent catalyst may advantageously be pretreated prior to formation of the salt layer thereon to remove organic matter and poisons and prevent excessively rapid attack of the metal by the organic acid or salt of such acid which may lessen adherence of the layer of salt to the metal surface. The pretreatment may involve, for example, immersion of the spent catalysts for a short time in a cold solution of the acid employed for treating the metal or roasting in air at a temperature of 300° C. or higher.

Preferably oxalic acid solution is employed for producing an oxalate film on the surfaces of the metallic masses. The oxalic acid solution may advantageously be of a concentration of from .1 to 1.5 normal. If it is desired to increase the attack of the oxalic acid or other solution employed on the surfaces to be activated or remove sulfur in reactivating spent catalysts, an oxidizing agent is added to the solution; for example, sufficient nitric acid may be added to the acid solution to produce a nitric acid concentration of from 0.1 to 4 normal. Other materials may also be added to the acid solution. For example, bromine, chlorine, and hydrochloric acid accelerate reaction of the acid with the metal but their use may necessitate washing of the coated metal to remove halogen compounds therefrom. No washing of the oxalate coated particles is ordinarily necessary when the treating solution contains only oxalic acid or oxalic and nitric acids. Ammonia may be incorporated in the solution to lower the hydrogen ion concentration and increase the oxalate ion concentration; a salt of the acid employed and the metal being treated may be suspended in the acid solution in which case some of the suspended salt may settle out and help build up the salt layer on the metal masses.

Any liquid which possesses good solvent properties for the organic acid employed and in which the salt of the metal undergoing treatment and the acid is substantially insoluble may be employed as the medium in which treatment of the metal is carried out. For example, water or ethyl alcohol or water-alcohol mixtures may be utilized as the dissolving medium for the acids. Other organic solvents may also be utilized, e. g. methyl alcohol, propyl alcohol, isopropyl alcohol, acetone, and dioxane may be employed. It is desirable to use alcohol solvent when treating cobalt.

In preparing copper catalysts, an oxide film should be produced on the surface of the metal masses, for example, by roasting the masses in air prior to the acid treatment, or an oxidizing agent such as nitric acid should be incorporated in the organic acid solution to promote attack on the metal by the solution. An oxidizing agent such as nitric acid also promotes attack on nickel by oxalic acid and should be employed when tartaric acid is utilized for coating nickel masses; when maleic acid is employed for coating nickel masses, they may be pretreated to produce an oxide film thereon or an oxidizing agent such as nitric acid may be incorporated in the maleic acid solution.

The temperature of the acid solution in which the metal is treated may vary from room temperature to gentle boiling (20° to 100° C.). Progressive lowering or raising of the temperature of the acid solution has a tendency to produce a more adherent salt layer than is produced when the temperature of the solution remains constant. The time of treatment of the metal in the acid solution may vary with the temperature of the solution, the concentration of the acid and other factors. Satisfactory adherent oxalate coated metal masses have been obtained by immersion of the metal in heated acid solution for from 1 to 3 hours; if cold oxalic acid solution is utilized prolonged immersion, e. g. for several weeks, may be required.

Agitation of the acid solution may be helpful to obtain contact between the solution and the metal and for preventing gas becoming trapped adjacent the metal surface, thereby lessening adherence of the metal salt of the acid to the body of the metal. Convection currents rising in the solution may effect adequate circulation of the solution to produce the desired results.

In general decomposition of the adherent layer of the metal salt formed on the surface of the metal masses may be effected in any manner that produces an adherent surface coating that is catalytically active or potentially active, e. g. oxidation in a heated current of oxidizing gas, anodic oxidation, oxidation in a solution of oxidizing agent or decomposition in a heated reducing atmosphere. Adherent oxalate layers may be oxidized by subjecting the oxalate coated metal to a current of oxidizing gas such as air, oxygen, or nitrous oxide, preferably at a temperature of 300° to 380° C. Anodic oxidation of the oxalate may be effected by connecting the oxalate coated metal as the anode in a solution of a suitable electrolyte in which the oxalate is substantially insoluble and passing an electric current through the solution. Oxidation of the oxalate layer may also be accomplished by immersing the oxalate coated metal in an alkaline solution of hypohalite, e. g. hypobromite or hypochlorite, containing hypohalite in concentration of from 0.025 to 1 mol per liter and a molar concentration of caustic soda equal to at least four times and preferably eight to sixteen times the molar concentration of the hypohalite. When decomposition of the salt layer is effected by anodic or hypohalite oxidation, it may be advantageous to wash the catalyst prior to use. Decomposition of the oxalate layer on the metal masses may also be accomplished by heating the oxalate coated metal masses in a current of hydrogen to a temperature of about 400° C.

The oxide layer on the metal masses, whether produced by anodic oxidation or otherwise may be reduced, prior to contacting it with the reaction mixture, by heating the catalyst in an atmosphere of hydrogen, or reduction may be accomplished during hydrogenation by the hydrogenation reaction mixture; reduction, however, is not necessary to produce effective catalysts.

Promoters may be incorporated in the catalyst surface and may be dissolved in the acid solution employed if soluble therein. If it is desired to employ a promoter insoluble in the acid, it may be applied either before or after the acid treatment. For example, the masses of metal may be immersed in a cerous nitrate solution and then roasted or the masses may be immersed in a cerous nitrate solution just prior to the oxalic acid treatment.

The process of this application may be employed to form adherent, active catalytic surfaces on masses of metallic nickel, copper and cobalt, e. g. metal turnings, rings, helices, wool, gauze, millings, etc. It is effective on smooth as well as rough metal surfaces. Furthermore, relatively finely divided catalysts not used in space or bulk form may be produced by treating relatively finely divided nickel, copper or cobalt particles with oxalic, maleic, or tartaric acid so that the surfaces only or a large part of the particles are converted to metal salt adhering to the body of metal, which salt may then be decomposed, as hereinabove described, to produce active finely divided catalyst.

The invention is applicable to the preparation of active catalysts from spent catalytic material involving a nickel, copper or cobalt mass having a surface of reduced catalytic activity, as well as from masses of clean metal. In order to promote the formation of an adherent salt layer on the spent catalytic metal masses, it is advantageous to pretreat the masses prior to the acid treatment hereinabove described, particularly when oxalic acid is employed, for the purpose of retarding reaction of the acid solution with the metal.

The pretreatment may involve immersion of the spent catalysts for a short time in a cold solution of the acid employed for reactivation and drying, or the masses may be roasted in air to above 300° C. before the acid treatment hereinabove disclosed. Such pretreatment prevents excessive rapidity of attack during the subsequent acid treatment and promotes formation of an adherent salt layer on the metal surface. The temperature of the acid solution employed for the subsequent acid treatment may gradually be raised, e. g. the subsequent oxalic acid treatment preferably should begin with the oxalic acid solution at a temperature of 50° C. or lower; the temperature of the acid solution may then be raised and maintained for the desired time in the neighborhood of boiling, e. g. from 95° to 100° C.

If the spent catalytic material is poisoned with sulfur, the heating in air, hereinabove described, may be continued at 400° to 550° C. until evolution of sulfur dioxide ceases. Incorporation of nitric acid in the acid solution with which the catalyst is treated after the cold acid or roasting pretreatment is also effective in eliminating sulfur poisoning. Sulfur may also be removed by heating the spent catalyst in hydrogen above 450° C., followed by roasting in air if desired.

Catalysts may be reactivated in accordance with the invention without removal from the reaction tubes in which they are utilized for catalyzing reactions, in which case the tubes and catalyst containers should be constructed of materials which are not deleteriously affected by the reactivating treatment, e. g. for nickel catalysts, nickel lined or nickel tubes and nickel containers may be employed.

The following examples are illustrative of the preparation of catalyst in accordance with the invention:

*Example I.*—A nickel screen basket containing clean nickel turnings was immersed in an aqueous solution containing 8 per cent of oxalic acid and .6 per cent of nitric acid. The temperature was raised from 20° C. to 95° C. over a period of two hours and maintained at about 95° C. for another hour. Heating of the acid solution was effected by a water bath. The basket of turnings coated with an adherent surface layer of nickel oxalate was then removed from the solution, allowed to drain, and dried at a temperature of from 100° to 200° C. The dry turnings were heated to 300° to 350° C. in a current of air until oxidation of the oxalate layer on the surface of the turnings, as indicated by complete blackening of the surface, occurred. The resultant catalytic material possessed a rugged, adherent surface film or layer of nickel oxide.

*Example II.*—A nickel screen cage containing nickel wire rings was immersed for two hours in a 0.5 molal acid ammonium oxalate solution nearly saturated with nickel oxalate. The temperature of the solution was gradually raised over the two hour period from 20° C. to 95° C. The cage of rings coated with an adherent surface layer of nickel oxalate was then removed from the solution, drained, dried at a temperature of about 210° C. and the nickel oxalate layer was decomposed by heating in air at a temperature of about 330° C. The resultant catalytic material had an adherent surface layer of nickel oxide.

*Example III.*—Nickel millings were coated with nickel oxide by the action of nitric acid vapors followed by heating in air. The oxide coating millings were immersed in a 3-normal solution of maleic acid and the solution was maintained at a temperature of about 100° C. for one hour. Heating was then discontinued and upon inspection of the millings after standing overnight they were found to be coated with nickel maleate. The solution was drained off and the millings were heated in air until the nickel maleate was converted to black adherent nickel oxide.

*Example IV.*—Nickel turnings were immersed over night at room temperature in a dioxane solution containing 1 mol of maleic acid and 0.5 mol of nitric acid per liter of the solution. The solution was then drained off, the turnings were dried and the surface layer of nickel maleate was converted to an adherent surface layer of nickel oxide by heating the turnings in air.

*Example V.*—Nickel turnings were immersed in a solution containing about 1.8 mols of tartaric acid and 0.5 mol of nitric acid per liter and maintained at a temperature of 100° C. for from 4 to 5 hours. The turnings coated with nickel tartrate were heated in air to decompose the tartrate and form on the surface of the millings an adherent layer of nickel oxide. Preferably, the acid solution employed is saturated with nickel tartrate prior to treatment of the metal masses in the solution to prevent the nickel tartrate formed on the surface of the nickel masses from dissolving in the solution.

*Example VI.*—A copper gauze cage containing copper turnings which had previously been surface oxidized by roasting in air was immersed in an 8 per cent oxalic acid solution for 5 hours. The temperature of the acid solution was raised from 20° to 92° C. over a period of 2 hours and maintained at 92° C. for 3 hours. The cage of oxalate coated turnings was removed from the solution, drained, dried at 100° to 200° C. and the oxalate coating was oxidized to an adherent layer of copper oxide by heating the turnings to 200° to 270° C. in a current of air.

*Example VII.*—Copper turnings were immersed in a water solution containing 0.5 mol of oxalic acid and 0.2 mol of nitric acid per liter and maintained at a temperature of 100° C. for 2 hours. The solution was drained off and the turnings were dried in air at a temperature of from 100° to 200° C. The turnings were allowed to cool and were then immersed in a water solution containing 0.5 mol of oxalic acid per liter and from 2 to 4 mols of nitric acid per liter and were maintained on a water bath for about 5 minutes until the reaction became violent. The solution was drained off and the metal was dried in air at 100° to 200° C. The resultant copper oxalate coated turnings were heated in air to between 250° and 300° C. until the copper oxalate film was converted to black adherent copper oxide.

*Example VIII.*—Copper turnings were immersed overnight at room temperature in a dioxane solution containing 0.5 mol of maleic acid and 0.2 mol of nitric acid per liter of the solution. The solution was then drained off, the turnings were dried at a temperature of from 100° to 200° C. and the coating of copper maleate on the turnings was decomposed in a current of air at a temperature of between 235° and 260° C. to produce an adherent layer of copper oxide.

*Example IX.*—Copper turnings were immersed overnight at room temperature in a dioxane solution containing 0.5 mol of tartaric acid and 2 mols of nitric acid per liter. The solution was drained off, the turnings were dried at a temperature of 100° to 200° C. and the coating of copper tartrate on the turnings was decomposed in a current of air at a temperature of 235° to 260° C. to produce an adherent layer of copper oxide.

*Example X.*—Thin hammered masses of metallic cobalt were immersed in nitric acid solution until the reaction became violent and were then withdrawn from the solution and heated to convert the surface cobalt nitrate to cobalt oxide. The cobalt masses were then immersed in a 0.7-normal oxalic acid solution at room temperature until a layer of cobalt oxalate formed on the metal surface. The cobalt oxalate layer was converted to adherent cobalt oxide both by anodic oxidation and oxidation in an alkaline solution of sodium hypobromite as hereinabove described.

The following examples are illustrative of the reactivation of catalysts in accordance with the invention.

*Example XI.*—A nickel screen cage containing sulfur poisoned spent nickel turning catalytic material was cleaned by steaming or washing the catalytic material with a suitable solvent to free it of organic matter. The catalytic material was then roasted in a stream of air at a temperature of about 550° C. until the effluent air did not alter the color of a neutral metal orange solution. The roasted material was then cooled, introduced into an 8 per cent oxalic acid solution at a temperature of 90° C. and the temperature of the solution raised gradually and maintained at 95° to 100° C. for from two to three hours. The cage of oxalate coated turnings was then removed from the acid solution, drained, dried and the oxalate coating decomposed by heating in air at a temperature of from 300° to 380° C.

*Example XII.*—A nickel screen cage containing spent nickel wire helix catalytic material was cleaned as described in Example XI, and immersed in a cold 8 per cent oxalic acid solution for a period of about one minute. The wire was then dried at 100° to 250° C., cooled to room temperature, after which it was immersed in an 8 per cent oxalic acid solution for three hours. The temperature of the acid solution was raised from about 20° C. at the start to 90° C. over a period of two hours and maintained at from 90° to 95° C. for one hour. The cage of oxalate coated nickel wire helices was removed from the acid solution, drained, dried and the oxalate coating was decomposed by heating in air at a temperature of from 300° to 380° C.

*Example XIII.*—A nickel screen cage of spent nickel wire ring catalyst was washed with water, heated in oxygen to 325° C., cooled and immersed in a cold 0.5 molal oxalic acid solution for three minutes. The metal rings were drained, dried and heated again in oxygen to 330° C. The rings were then immersed for ten minutes at room temperature in a 4-normal solution of ammonium hydroxide nearly saturated with nickel oxalate and containing about 0.5 mol of ammonium oxalate per liter. After removal of the rings from the solution, draining and heating them in air to 340° C., they were found to have a black adherent active surface layer of nickel oxide.

Catalysts prepared in accordance with the above examples are suitable for catalyzing hydrogenation, dehydrogenation and oxidation, e. g., air oxidation of organic materials; e. g., the catalyst of Example I was employed for catalyzing the hydrogenation of phenol. It was found to possess high activity, capacity and long life. For example, passage of a reaction mixture of phenol and hydrogen under pressure of 50 to 100 pounds per square inch at a temperature of 240° to 300° C. at a rate of 10 cc. liquid phenol per minute for six hours over a cage 36" long and 2" in diameter filled with the catalyst resulted in conversion of about 98 per cent of the phenol to a cyclohexanol-cyclohexanone mixture. The catalyst of Example VI was employed for dehydrogenation of cyclohexanol to cyclohexanone. Catalysts produced in accordance with Examples VIII and IX were utilized for the conversion of methanol to formaldehyde.

Cages of catalysts 36" long and 2" in diameter of nickel catalysts reactivated in accordance with Example XI were installed in reaction chambers and used for hydrogenating phenol to a cyclohexanol-cyclohexanone mixture and dehydrogenation of cyclohexanol to cyclohexanone. Passage of a reaction mixture of phenol and hydrogen at a pressure of 50 pounds per square inch and temperature of 240° to 250° C. at a rate of 10 cc. liquid phenol per minute for 3.2 hours resulted in conversion of 92 per cent of the phenol to a cyclohexanol-cyclohexanone mixture. Passage of cyclohexanol at a pressure of from 20 to 95 pounds per square inch and temperature of 270° to 370° C. at a rate of 7.5 cc. liquid cyclohexanol per minute for 20 hours resulted in conversion of about 40 per cent of the cyclohexanol to cyclohexanone.

Catalysts produced in accordance with Example XII were employed for hydrogenating phenol to a cyclohexanol-cyclohexanone mixture, benzol to cyclohexane and cresol to methyl cyclohexanol-methyl cyclohexanone mixture. Passage of a reaction mixture of phenol and hydrogen under pressure of 40 to 50 pounds per square inch at a temperature of 170° to 280° C. at a rate of 12.8 cc. liquid phenol per minute for 12 hours over two cages each 36" long and 2" in diameter filled with the catalyst resulted in conversion of about 98 per cent of phenol to a cyclohexanol-cyclohexanone mixture. Passage of a reaction mixture of benzol and hydrogen under pressure of 50 pounds per square inch at a temperature of 200° to 270° C. at a rate of 8.7 cc. liquid benzol per minute for six hours over a cage 36" long and 2" in diameter filled with the catalyst effected conversion of about 86 per cent of the benzol to cyclohexane. Passage of a reaction mixture of cresol and hydrogen under pressure of 50 to 100 pounds per square inch at a temperature of 160° to 250° C. at a rate of 9 cc. liquid cresol per minute for 10.5 hours over two cages each 36" long and 2" in diameter filled with the catalyst resulted in conversion of about 98 per cent of the cresol to a methyl cyclohexanol-methyl cyclohexanone mixture.

The process of this application yields catalysts of high activity and has the advantage that it can be employed repeatedly to obtain catalysts of substantially the same activity. Furthermore, surfaces of catalytic metal masses may be repeatedly reactivated without undue loss of the metal.

Since certain changes may be made without departing from the scope of the invention, it is intended that the above shall be interpreted as illustrative and not in a limiting sense.

I claim:

1. In a process of producing a catalyst, the steps which comprise reacting a mass of metal of the group consisting of nickel, copper and cobalt with a solution containing a reagent of the group consisting of oxalic, maleic and tartaric acids, and salts thereof, to produce an adherent layer of metal oxalate, maleate or tartrate on said metal, said solution containing an oxidizing agent other than said reagent for promoting attack of said mass by said reagent, and decomposing said adherent layer to form a catalytic surface on said metal.

2. In a process of producing a catalyst, the steps which comprise reacting a mass of metal of the group consisting of nickel, copper and cobalt having a preoxidized surface layer with a solution containing a reagent of the group consisting of oxalic, maleic and tartaric acids, and salts of said acids and an oxidizing agent other than said reagent for promoting attack of the surface of said metal mass by said reagent to produce an adherent layer of metal oxalate, maleate or tartrate on said metal, and decomposing said adherent layer to form a catalytic surface on said metal.

3. In a process of producing a catalyst, the steps which comprise reacting a mass of metal of the group consisting of nickel, copper and cobalt having a preoxidized surface layer with a solution containing a reagent of the group consisting of oxalic, maleic and tartaric acids, and salts of said acids to produce an adherent layer of metal oxalate, maleate or tartrate on said metal, and decomposing said adherent layer to form a catalytic surface on said metal.

4. A process of preparing a catalyst involving a catalytically active surface on a mass of metal of the group consisting of nickel, copper, and cobalt, which comprises treating a mass of the metal having a preoxidized surface with a solution of oxalic acid of a concentration of from .1 to 1.5 normal and an oxidizing agent to produce on the metal surface an adherent layer of the oxalate of the metal, and decomposing said adherent oxalate layer to form a catalytic surface on said metal mass.

5. A process of preparing a catalyst involving a catalytically active surface on a mass of metal of the group consisting of nickel, copper and cobalt which comprises treating a mass of the metal with a solution of oxalic acid of a concentration of from .1 to 1.5 normal and an oxidizing agent to produce on the metal masses an adherent layer of oxalate of the metal, and decomposing said adherent oxalate layer to form a catalytic surface on said metal mass.

6. A process of preparing a catalyst involving a catalytically active surface on a mass of metal of the group consisting of nickel, copper and cobalt which comprises treating a mass of the metal having a preoxidized surface with a solution of oxalic acid of a concentration of from .1 to 1.5 normal to produce on the metal surface an adherent layer of the oxalate of the metal, and decomposing said adherent oxalate layer to form a catalytic surface on said metal mass.

7. A process as defined in claim 5 in which the temperature of the oxalic acid solution is varied gradually within the range of about atmospheric to boiling temperature during the reaction.

8. A process as defined in claim 6 in which the temperature of the oxalic acid solution is varied gradually within the range of about atmospheric to boiling temperature during the reaction.

9. A process as defined in claim 5 in which the oxalate layer on the metal mass is decomposed by heating the mass in an oxidizing atmosphere to produce an oxide layer on said mass.

10. A process as defined in claim 6 in which the oxalate layer on the metal mass is decomposed by heating the mass in an oxidizing atmosphere to produce an oxide layer on said mass.

11. A process of preparing catalytic material which comprises treating masses of metallic nickel with a solution of oxalic acid of a concentration of .1 to 1.5 normal to produce on the masses adherent layers of nickel oxalate and decomposing the oxalate layers to form catalytically active surface layers on said masses.

12. The process as defined in claim 11 in which the temperature of the oxalic acid solution is gradually and progressively varied within the range of about atmospheric to boiling temperature during the reaction.

13. In a process of producing a catalyst the steps which comprise reacting a mass of metal of the group consisting of nickel, copper and cobalt having a preoxidized surface layer with a solution of maleic acid to produce an adherent layer of the metal maleate on said metal, and decomposing said adherent layer to produce a catalytic surface on said metal.

14. A process of preparing a catalyst involving a catalytically active surface on a mass of metal of the group consisting of nickel, copper and cobalt which comprises treating the metal mass with a solution containing acid of the group consisting of oxalic acid, maleic acid and tartaric acid and an oxidizing agent to produce an adherent layer of the salt of the metal employed and the acid employed on the surface of the metal and decomposing said salt layer to produce a catalytically active surface on said mass.

15. A process of preparing a catalyst involving a catalytically active surface on a mass of metal of the group consisting of nickel, copper and cobalt which comprises treating the metal mass with a solution of oxalic acid and nitric acid to produce an adherent layer of the metal oxalate on the surface of the metal and decomposing the oxalate layer to produce a catalytically active surface on said mass.

16. A process of reactivating spent catalytic material involving masses of metal of the group consisting of nickel, copper and cobalt comprising immersing the masses of metal in a cold solution of oxalic acid to deactivate the catalyst, subsequently treating the metal masses with a solution of oxalic acid at a higher temperature to produce thereon an adherent layer of metal oxalate and decomposing the oxalate layer to produce catalytically active surfaces on said masses.

17. The process of reactivating spent catalytic material involving masses of metal of the group consisting of nickel, copper and cobalt comprising heating the spent catalytic material in hydrogen at an elevated temperature, treating the metal masses with a solution of oxalic acid to produce thereon an adherent layer of oxalate of the metal and decomposing the oxalate layer.

18. A process of preparing hydrogenation catalyst which comprises treating masses of metallic nickel with a .1 to 1.5 normal oxalic acid solution containing a concentration of nitric acid within the range of 0.1 to 4.0 normal, gradually raising the temperature of the acid solution from about atmospheric temperature to about 95° C. to produce on the nickel masses an adherent layer of nickel oxalate, removing the oxalate coated nickel masses from the acid solution, drying the coated nickel masses, oxidizing the nickel oxalate in air at a temperature of from about 300° to 380° C. until substantially complete blackening of the surface of the masses occurs and subjecting the masses to reducing conditions.

19. A process of reactivating spent nickel hydrogenation catalytic material involving masses of metallic nickel having a surface of reduced catalytic activity comprising removing organic matter from the catalytic material, heating the catalytic material in air at a temperature above 300° C., treating the catalytic material in a 0.1 to 1.5 normal solution of oxalic acid to produce on the surface of the nickel masses an adherent layer of nickel oxalate, drying the catalytic material, oxidizing the oxalate layer in air maintained at a temperature of from about 300° to 380° C. to convert the oxalate layer into an adherent layer of nickel oxide and subjecting the catalytic material to reducing conditions.

AUGUSTUS S. HOUGHTON.